(12) United States Patent
Teraoka (10) Patent No.: US 9,759,890 B2
(45) Date of Patent: Sep. 12, 2017

(54) IMAGING LENS SYSTEM (71) Applicant: Hiroyuki Teraoka, Shenzhen (CN)

(72) Inventor: Hiroyuki Teraoka, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 241 days.

(21) Appl. No.: 14/701,638

(22) Filed: May 1, 2015

(65) Prior Publication Data

US 2016/0154208 A1 Jun. 2, 2016

(30) Foreign Application Priority Data

Nov. 28, 2014 (JP) .................... 2014-241131

(51) Int. Cl.
G02B 13/00 (2006.01)
(52) U.S. Cl.
CPC ................ *G02B 13/0045* (2013.01)
(58) Field of Classification Search
CPC ........ G02B 13/0045; G02B 9/60; G02B 9/62; G02B 9/64
USPC .......................... 359/764, 754–759
See application file for complete search history.

(56) References Cited

U.S. PATENT DOCUMENTS 5,011,272 A * 4/1991 Nakayama ........... G02B 15/161
359/653

FOREIGN PATENT DOCUMENTS

JP 2013-222172 10/2013
JP 2014-092781 5/2014

* cited by examiner

*Primary Examiner* — Bumsuk Won
*Assistant Examiner* — Wen Huang
(74) *Attorney, Agent, or Firm* — Na Xu; IPro, PLLC (57) ABSTRACT An imaging lens system includes, arranged in succession from an object side to an image side, an aperture stop S, a first lens L1 having a positive refractive power, a second lens L2 having a negative refractive power, a third lens L3 having a positive refractive power, a fourth lens L4 having a positive refractive power, and a fifth lens L5 having a negative refractive power. $0.70 \leq f1/f \leq 0.85$; $-1.15 \leq (R1+R2)/(R1-R2) \leq -1.00$; $-0.55 \leq (R3+R4)/(R3-R4) \leq -0.20$; $0.09 \leq d8/f \leq 0.15$; f/f1 is respectively a focal length of the lens system LA or lens L1; R1/R2 is respectively a curvature radius of the object/image side of the lens L1; R3/R4 is a curvature radius of the object/image side of the lens L2; d8 is an axial distance between the image side of the lens L4 to the object side of the lens L5.

4 Claims, 9 Drawing Sheets

Spherical Aberration (On-axis Chromatic Aberration)

Spherical Aberration (On-axis Chromatic Aberration)

Spherical Aberration (On-axis Chromatic Aberration)

Spherical Aberration (On-axis Chromatic Aberration)

IMAGING LENS SYSTEM

FIELD OF THE INVENTION

The present invention relates to an imaging lens system, and more particularly to an imaging lens system with high imaging performance and suitable for installation into an image input device of a portable telephone or personal computer, a digital camera, a CCD or CMOS camera used for monitoring purposes, a surveying device, or similar.

DESCRIPTION OF RELATED ART

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been widely used in compact information terminals such as cellular phone sets.

With increases in the miniaturization and pixel density of solid-state image sensing devices, demands have arisen for smaller and higher-performance imaging lenses to be mounted in these imaging apparatuses. In this disclosure, an imaging lenses system used for such an application includes, arranged in succession from an object side to an image side: a first lens having a positive refracting power, a second lens having a negative refractive power, a third lens having a positive refractive power, a fourth lens having a positive refractive power, and a fifth lens having a negative refractive power.

Japanese Patent Application Publication No. JP2013-222172 discloses an imaging lens system in embodiments 1-9, having the aforementioned five lenses, in which, the first and second lenses are not properly shaped, therefore it may weaken the miniaturization, wide-angle and the effect of realizing TTL/IH>1.71, and 2ω<71.1°.

Japanese Patent Application Publication No. JP2014-044372 discloses another type of imaging lens system in its embodiments 1-6, which also includes the aforementioned five lenses, while the refractive power of the first lens, and the shape of the second lens re not configured properly, so the effect of achieving 2ω<71.1° and a wide angle may not be satisfying.

Accordingly, an improved imaging lens which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to several embodiments.

Figure 1:
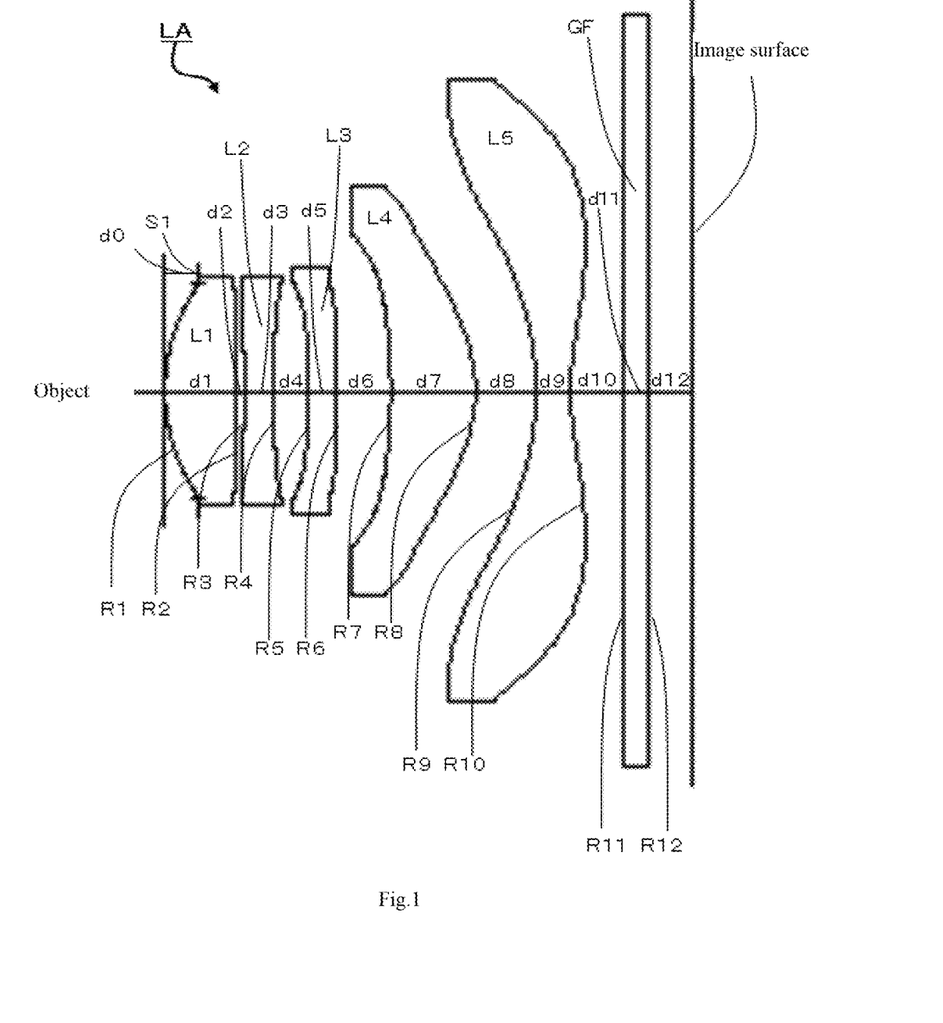
FIG. 1 is an illustrative structure of an imaging lens system related to the present invention.

Referring to FIG. 1, an imaging lens system LA related to the present invention includes, from an object side to an image side, an aperture stop S1, a first lens L1, a second lens L2, a third lens L3, a fourth lens L4, and a fifth lens L5. A glass plate GF is arranged between the fifth lens L5 and an image surface. The glass plate GF may be a cover glass, an IR filter, or a low frequency filter. Alternatively, the glass plate may be arranged at other positions.

The first lens L1 has a positive refractive power, the second lens L2 has a negative refractive power, the third lens L3 has a positive refractive power, the fourth lens L4 has a positive refractive power, and the fifth lens L5 has a negative refractive power. With the configuration of the refractive powers of the lenses, the imaging lens system LA may be miniaturized. Further, for correcting aberrations appropriately, these five lenses are configured to be aspherical.

The imaging lens system LA satisfies the following conditions (1)-(4):

$$0.70 \leq f1/f \leq 0.85 \tag{1}$$

$$-1.15 \leq (R1+R2)/(R1-R2) \leq -1.00 \tag{2}$$

$$-0.55 \leq (R3+R4)/(R3-R4) \leq -0.20 \tag{3}$$

$$0.09 \leq d8/f \leq 0.15 \tag{4}$$

Where:

f is a focal length of the imaging lens system LA;

f1 is a focal length of the first lens L1;

R1 is a curvature radius of the object side of the first lens L1;

R2 is a curvature radius of the image side of the first lens L1.

R3 is a curvature radius of the object side of the second lens L2;

R4 is a curvature radius of the image side of the second lens L2;

d8 is an axial distance between the image side of the fourth lens

L4 to the object side of fifth lens L5.

Condition (1) prescribes the positive refractive power of the second lens L2. If the value excesses the minimum limit, although it facilitates the miniaturization of the imaging lens system LA, the positive refractive power of the first lens L1 is too powerful to correct image aberrations. If the value excesses the maximum limit, the positive refractive power of the first lens L1 is weakened and it is difficult to miniaturize the imaging lens system LA.

Condition (2) prescribes the shape of the first lens L1. If the value fails to satisfy this condition, with the miniaturization and wide-angle development of the imaging lens system LA, it is difficult to correct the high order aberrations, for example spherical aberrations.

Condition (3) prescribes the shape of the second lens L2. If the value fails to satisfy this condition, with the miniaturization and wide-angle development of the imaging lens system LA, it is difficult to correct the on-axis chromatic aberrations.

Condition (4) prescribes the ratio of the distance from the image side of the fourth lens L4 to the object side of fifth lens L5, and the focal length of the imaging lens system LA. If the value fails to satisfy this condition, it adds difficulties to the miniaturization and wide-angle development of the imaging lens system LA.

Further, the imaging lens system LA satisfies the following conditions (5):

$$0.12 \leq d6/f \leq 0.15 \tag{5}$$

Where:

f is the focal length of the imaging lens system LA;

d6 is an axial distance between the image side surface of the third lens L3 and the object side surface of the fourth lens L4.

Condition (5) prescribes ratio of the distance from image side surface of the third lens L3 and the object side surface of the fourth lens L4, and the focal length of the imaging lens system LA. If the value fails to satisfy this condition, it adds difficulties to the miniaturization and wide-angle development of the imaging lens system LA.

Further, the imaging lens system LA satisfies the following condition (6):

$$-2.50 \leq f2/f \leq -1.00 \tag{6}$$

Where:

f is the focal length of the imaging lens system LA;

f2 is a focal length of the second lens L2.

Condition (6) prescribes the negative refractive power of the second lens L2. If the value fails to satisfy this condition, with the miniaturization and wide-angle development of the imaging lens system LA, it is difficult to correct the aberrations, for example off-axis and on-axis chromatic aberrations.

The third lens L3 has a positive refractive power, and the imaging lens system LA further satisfies the following condition (7)-(8):

$$f3/f \geq 50.00 \tag{7}$$

$$(R5+R6)/(R5-R6) \leq -8.00 \tag{8}$$

Where:

f is the focal length of the imaging lens system LA;

f3 is a focal length of the third lens L3;

R5 is a curvature radius of the object side the third lens L3;

R6 is a curvature radius of the image side the third lens L3.

Condition (7) prescribes the positive refractive power of the third lens L3. When the value satisfies this condition, it may not only efficiently help to the miniaturization and wide-angle development of the imaging lens system LA, but also facilitate correcting the aberrations, for example off-axis and on-axis chromatic aberrations.

Condition (8) prescribes the shape of the third lens L3. When the value satisfies this condition, with the miniaturization and wide-angle development of the imaging lens system LA, it may efficiently help to the miniaturization and wide-angle development of the imaging lens system LA.

By virtue of the configurations and conditions set forth in the forgoing description, an improved imaging lens system LA having the characteristics of wide-angle, miniaturization, TTL/IH≤1.40, 2ω≥78°, and Fno (F number)≤2.2, is accordingly obtained.

Hereinafter, detailed embodiments will be described to test and verify the conditions set forth in the above descriptions.

The parameters of the imaging lens system LA are defined as follows, and the unit of each of the distance, radius, and thickness is millimeter (mm).

f: the focal length of the imaging lens system LA;

f1: the focal length of the first lens L1;

f2: the focal lens of the second lens L2;

f3: the focal lens of the third lens L3;

f4: the focal lens of the fourth lens L4;

f5: the focal lens of the fifth lens L5;

Fno: F number

2ω: full visual angle

S1: aperture stop

R: curvature radius

R1: the curvature radius of the object side surface of the first lens L1;

R2: the curvature radius of the image side surface of the first lens L1;

R3: the curvature radius of the object side surface of the second lens L2;

R4: the curvature radius of the image side surface of the second lens L2;

R5: the curvature radius of the object side surface of the third lens L3;

R6: the curvature radius of the image side surface of the third lens L3;

R7: the curvature radius of the object side surface of the fourth lens L4;

R8: the curvature radius of the image side surface of the fourth lens L4;

R9: the curvature radius of the object side surface of the fifth lens L5;

R1: the curvature radius of the image side surface of the fifth lens L5;

R1: the curvature radius of the object side surface of the glass plate GF;
R12: the curvature radius of the image side surface of the glass plate GF;
d: axial thickness of the lens, or distance between lenses;
d0: the axial distance between the aperture stop S1 and the object side surface of the first lens L1;
d1: the axial thickness of the first lens L1;
d2: the axial distance between the image side surface of the first lens L1 and the object side surface of the second lens L2;
d3: the axial thickness of the second lens L2;
d4: the axial distance between the image side surface of the second lens L2 and the object side surface of the third lens L3;
d5: the axial thickness of the third lens L3;
d6: the axial distance between the image side surface of the third lens L3 and the object side surface of the fourth lens L4;
d7: the axial distance of the fourth lens L4;
d8: the axial distance between the image side surface of the fourth lens L4 and the object side surface of the fifth lens L5;
d9: the axial thickness of the fifth lens L5;
d10: the axial distance between the image side surface of the fifth lens L5 and the object side surface of the glass plate GF;
d1: the axial thickness of the glass plate GF;
d12: the axial distance between the image side surface of the glass plate GF and the image surface;
nd: d line refraction index
nd1: d line refraction index of the first lens L1;

Where, R is the axial curvature radius, k is the conic coefficient, A4~A16 are aspherical coefficients.

Optionally, each aspherical surface of each lens could be obtained according to condition (13). Of course, the aspherical surface may also be obtained according to other condition.

[Embodiment 1]

Figure 2:
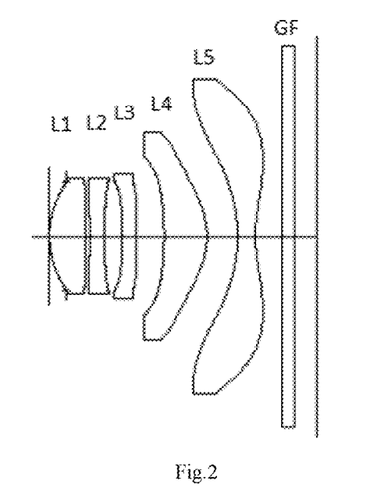
FIG. 2 is an illustrative structure of an imaging lens system related to a first embodiment of the present disclosure.

FIG. 2 shows an imaging lens system LA in accordance with Embodiment 1 of the present invention. Table 1 shows the detailed optical data of Embodiment 1. The conic coefficient and aspherical coefficient of the surfaces of the lenses of Embodiment 1 are listed in Table 2.

TABLE 1

|  | R |  | d | nd |  | vd |
|---|---|---|---|---|---|---|
| S1 | ∞ | d0 = | −0.250 |  |  |  |
| R1 | 1.42086 | d1 = | 0.552 | nd1 | 1.5441 v1 | 56.12 |
| R2 | 114.06203 | d2 = | 0.066 |  |  |  |
| R3 | −5.28186 | d3 = | 0.225 | nd2 | 1.6510 v2 | 21.51 |
| R4 | 15.69255 | d4 = | 0.255 |  |  |  |
| R5 | 11.40793 | d5 = | 0.235 | nd3 | 1.6510 v3 | 21.51 |
| R6 | 11.54192 | d6 = | 0.417 |  |  |  |
| R7 | −4.80314 | d7 = | 0.657 | nd4 | 1.5441 v4 | 56.12 |
| R8 | −1.11946 | d8 = | 0.467 |  |  |  |
| R9 | −2.58104 | d9 = | 0.272 | nd5 | 1.5441 v5 | 56.12 |
| R10 | 1.95912 | d10 = | 0.400 |  |  |  |
| R11 | ∞ | d11 = | 0.210 | nd6 | 1.5168 v6 | 64.17 |
| R12 | ∞ | d12 = | 0.341 |  |  |  |

TABLE 2

| | conic coefficient | aspherical coefficient | | | | | | |
|---|---|---|---|---|---|---|---|---|
|  | k | A4 | A6 | A8 | A10 | A12 | A14 | A16 |
| R1 | 6.8146E−02 | −1.1921E−02 | 2.0851E−02 | −8.5269E−02 | 2.1275E−02 | 3.4900E−02 | 2.2141E−02 | −1.2501E−01 |
| R2 | 0.0000E+00 | −2.2810E−02 | −1.3024E−02 | 8.8008E−02 | −1.3505E−01 | −1.2073E−01 | 6.2492E−03 | 8.2286E−02 |
| R3 | 0.0000E+00 | 6.8314E−02 | 5.6668E−02 | 7.9184E−03 | −4.0275E−02 | −8.4171E−02 | −7.0973E−02 | 1.4224E−01 |
| R4 | −3.8793E+02 | 7.2878E−02 | 2.2776E−02 | −3.4173E−02 | 7.7336E−02 | −8.7613E−02 | −4.8772E−02 | 7.1592E−02 |
| R5 | −2.5353E+02 | −2.4977E−01 | −3.5405E−02 | −1.0712E−01 | 1.9118E−02 | 2.5398E−01 | 2.4167E−01 | −2.6535E−01 |
| R6 | 1.1637E+02 | −1.9958E−01 | −4.8390E−02 | 1.5556E−02 | 4.3468E−02 | 3.8021E−02 | 3.9750E−02 | 3.2725E−02 |
| R7 | 7.7631E+00 | −7.1962E−04 | −1.4944E−02 | −3.2077E−02 | 6.2996E−03 | 4.3361E−03 | 1.0020E−03 | −6.6594E−04 |
| R8 | −3.8572E+00 | −7.6404E−02 | 8.0780E−02 | −3.6430E−02 | 7.5631E−03 | −3.3522E−04 | 4.0454E−04 | −2.3129E−04 |
| R9 | −3.0986E+00 | −4.5210E−02 | 1.2481E−02 | 7.2775E−04 | −2.3569E−04 | −8.7006E−06 | −6.1753E−08 | 1.3877E−06 |
| R10 | −1.6962E+01 | −5.9473E−02 | 1.8896E−02 | −4.2178E−03 | 5.1014E−04 | −3.2020E−05 | −4.9603E−07 | 2.9298E−07 | nd2: d line refraction index of the second lens L2;
nd3: d line refraction index of the third lens L3;
nd4: d line refraction index of the fourth lens L4;
nd5: d line refraction index of the fifth lens L5;
nd6: d line refraction index of the glass plate GF;
v: abbe number
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the glass plate GF;
TTL: the axial distance between the object side surface of the first lens L1 and the image plane (total track length);
LB: the axial distance between the image side surface of the fifth lens L5 and the image surface (including the axial thickness of the glass plate GF);
IH: image height.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}$$ (Condition 13)

Figure 3:
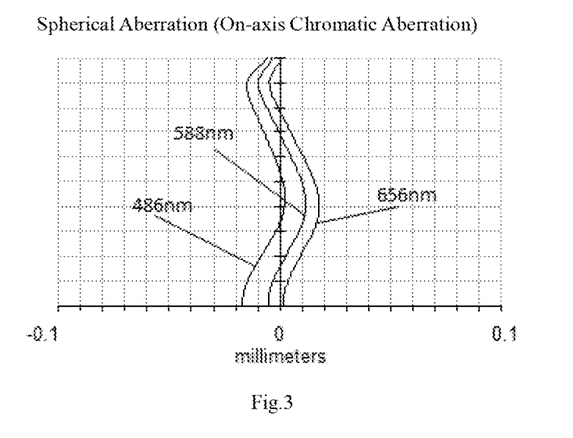
FIG. 3 is an aberration diagram showing spherical aberration (on-axis chromatic aberration) of the imaging lens system of the first embodiment.
Figure 4:
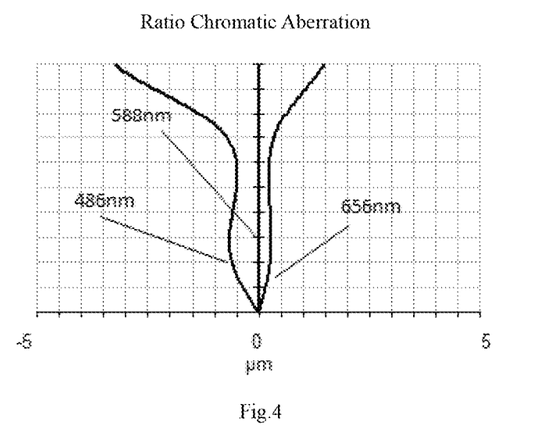
FIG. 4 is a ratio chromatic aberration diagram of the imaging lens system of the first embodiment.
Figure 5:
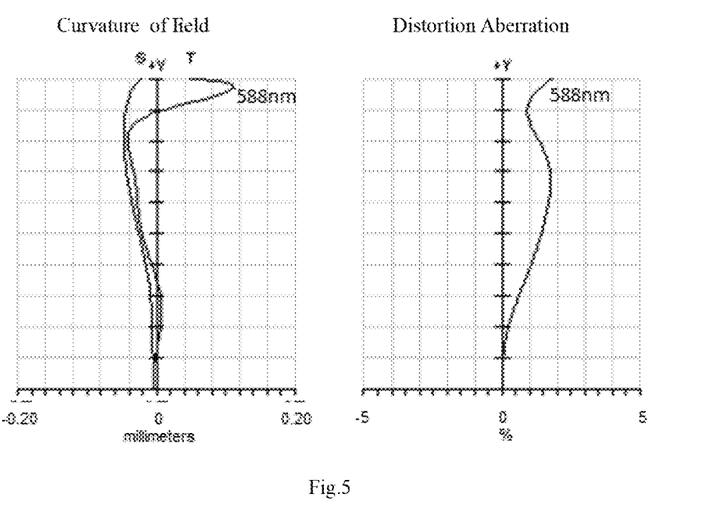
FIG. 5 is an aberration diagram showing the curvature of field and the distortion of the imaging lens system of the first embodiment.

Referring subsequent Table 9, it shows all the parameters of the imaging lens system of the embodiments corresponding to conditions (1)-(8). As shown in Table 7, the imaging lens system LA of Embodiment 1 satisfies all of the conditions (1)-(8). The spherical aberration (on-axis chromatic aberration) of the imaging lens system LA of Embodiment 1 is shown in FIG. 3. The ratio chromatic aberration is shown in FIG. 4. The curvature of field and the distortion aberration are shown in FIG. 5. Wherein, S shows the curvature of field corresponding to sagittal image surface, and T shows the curvature of field corresponding to tangential image surface, and the embodiments 2-4 are the same. By virtue of the configuration, the imaging lens system LA of Embodiment 1 has the characteristics of wide-angle, miniaturization, 2ω=83.0°, TTL/IH=1.327, and Fno=2.05, and according to FIG. 3-FIG. 5, the good optical performance of the imaging lens system LA can be seen.

[Embodiment 2]

Figure 6:
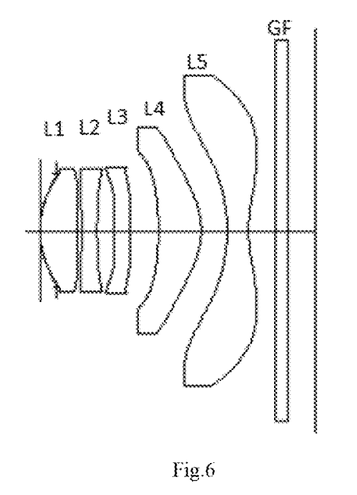
FIG. 6 is an illustrative structure of an imaging lens system related to a second embodiment of the present disclosure.

FIG. 6 shows an imaging lens system LA in accordance with Embodiment 2 of the present invention. Table 3 shows the detailed optical data of Embodiment 2. The conic coefficient and aspherical coefficient of the surfaces of the lenses of Embodiment 2 are listed in Table 4.

TABLE 3

|  | R | d |  | nd |  | vd |  |
|---|---|---|---|---|---|---|---|
| S1 | ∞ | d0 = | −0.250 |  |  |  |  |
| R1 | 1.40733 | d1 = | 0.563 | nd1 | 1.5441 | v1 | 56.12 |
| R2 | 97.30522 | d2 = | 0.069 |  |  |  |  |
| R3 | −5.31456 | d3 = | 0.233 | nd2 | 1.6510 | v2 | 21.51 |
| R4 | 14.96478 | d4 = | 0.260 |  |  |  |  |
| R5 | 11.48369 | d5 = | 0.234 | nd3 | 1.6510 | v3 | 21.51 |
| R6 | 11.53410 | d6 = | 0.431 |  |  |  |  |
| R7 | −4.74190 | d7 = | 0.651 | nd4 | 1.5441 | v4 | 56.12 |
| R8 | −1.11294 | d8 = | 0.397 |  |  |  |  |
| R9 | −2.51163 | d9 = | 0.323 | nd5 | 1.5441 | v5 | 56.12 |
| R10 | 1.92895 | d10 = | 0.400 |  |  |  |  |
| R11 | ∞ | d11 = | 0.210 | nd6 | 1.5168 | v6 | 64.17 |
| R12 | ∞ | d12 = | 0.399 |  |  |  |  |

TABLE 4

|  | conic coefficient | aspherical coefficient | | | | | | |
|---|---|---|---|---|---|---|---|---|
|  | k | A4 | A6 | A8 | A10 | A12 | A14 | A16 |
| R1 | 5.0394E−02 | −1.5259E−02 | 1.9908E−02 | −8.5505E−02 | 2.1491E−02 | 3.5672E−02 | 2.3807E−02 | −1.2155E−01 |
| R2 | 0.0000E+00 | −2.2612E−02 | −1.2842E−02 | 8.6938E−02 | −1.3373E−01 | −1.1992E−01 | 6.5231E−03 | 8.1558E−02 |
| R3 | 0.0000E+00 | 6.9400E−02 | 5.7249E−02 | 7.6388E−03 | −4.0952E−02 | −8.4712E−02 | −7.1082E−02 | 1.4278E−01 |
| R4 | −3.9101E+02 | 7.1821E−02 | 2.1664E−02 | −3.4202E−02 | 7.7906E−02 | −8.6970E−02 | −4.8259E−02 | 7.1895E−02 |
| R5 | −2.5545E+02 | −2.4947E−02 | −3.4962E−02 | −1.0711E−01 | 1.8831E−02 | 2.5360E−01 | 2.4130E−01 | −2.6580E−01 |
| R6 | 1.1699E+02 | −1.9945E−02 | −4.8122E−02 | 1.5901E−02 | 4.3674E−02 | 3.8077E−02 | 3.9719E−02 | 3.2721E−02 |
| R7 | 8.3415E+00 | −5.4723E−02 | −1.4808E−02 | −3.1729E−02 | 6.5223E−03 | 4.3225E−03 | 7.8654E−04 | −1.0271E−03 |
| R8 | −3.7787E+00 | −7.5908E−02 | 8.0616E−02 | −3.6537E−02 | 7.5320E−03 | −3.4050E−04 | 4.0700E−04 | −2.2804E−04 |
| R9 | −3.1014E+00 | −4.5122E−02 | 1.2507E−02 | 7.3281E−04 | −2.3478E−04 | −8.5619E−06 | −6.1620E−06 | 1.3863E−06 |
| R10 | −1.5104E+01 | −5.9732E−02 | 1.6860E−02 | −4.2235E−03 | 5.0925E−04 | −3.2156E−05 | −5.1754E−07 | 2.8908E−07 |

Figure 7:
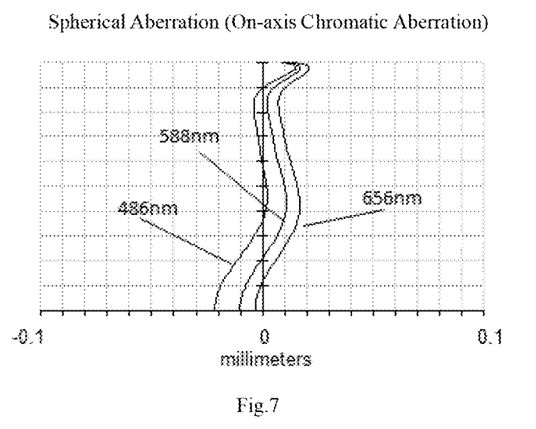
FIG. 7 is an aberration diagram showing spherical aberration (on-axis chromatic aberration) of the imaging lens system of the second embodiment.
Figure 8:
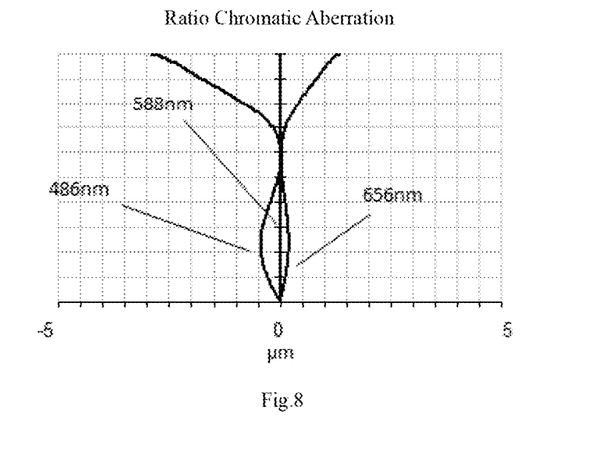
FIG. 8 is a ratio chromatic aberration diagram of the imaging lens system of the second embodiment.
Figure 9:
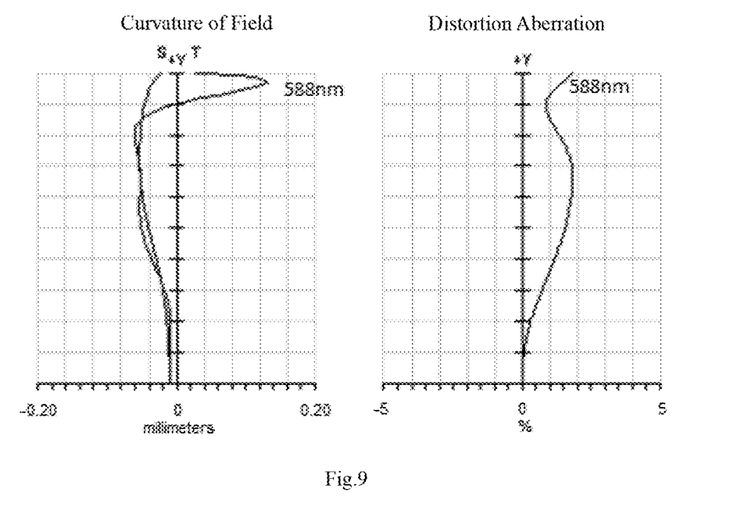
FIG. 9 is an aberration diagram showing the curvature of field and the distortion of the imaging lens system of the second embodiment.

As shown in Table 9, the imaging lens system LA of Embodiment 2 satisfies all of the conditions (1)-(8). The spherical aberration (on-axis chromatic aberration) of the imaging lens system LA of Embodiment 2 is shown in FIG. 7. The ratio chromatic aberration is shown in FIG. 8. The curvature of field and the distortion aberration are shown in FIG. 9. By virtue of the configuration, the imaging lens system LA of Embodiment 2 has the characteristics of wide-angle, miniaturization, 2ω=80.8°, TTL/IH=1.350, and Fno=2.05, and according to FIG. 7-FIG. 9, the good optical performance of the imaging lens system LA can be seen.

[Embodiment 3]

Figure 10:
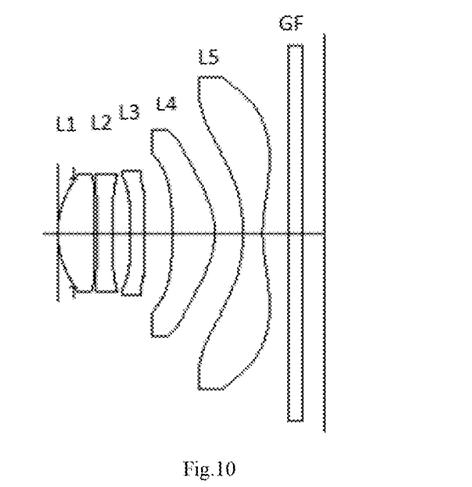
FIG. 10 is an illustrative structure of an imaging lens system related to a third embodiment of the present disclosure.

FIG. 10 shows an imaging lens system LA in accordance with Embodiment 3 of the present invention. Table 5 shows the detailed optical data of Embodiment 3. The conic coefficient and aspherical coefficient of the surfaces of the lenses of Embodiment 3 are listed in Table 6.

TABLE 5

|  | R | d |  | nd |  | vd |  |
|---|---|---|---|---|---|---|---|
| S1 | ∞ | d0 = | −0.250 |  |  |  |  |
| R1 | 1.39812 | d1 = | 0.553 | nd1 | 1.5441 | v1 | 56.12 |
| R2 | 26.84025 | d2 = | 0.062 |  |  |  |  |
| R3 | −5.70998 | d3 = | 0.229 | nd2 | 1.6510 | v2 | 21.51 |
| R4 | 17.13039 | d4 = | 0.266 |  |  |  |  |
| R5 | 11.33510 | d5 = | 0.231 | nd3 | 1.6510 | v3 | 21.51 |
| R6 | 11.39630 | d6 = | 0.434 |  |  |  |  |
| R7 | −4.83846 | d7 = | 0.651 | nd4 | 1.5441 | v4 | 56.12 |
| R8 | −1.11885 | d8 = | 0.436 |  |  |  |  |
| R9 | −2.44809 | d9 = | 0.300 | nd5 | 1.5441 | v5 | 56.12 |
| R10 | 1.94609 | d10 = | 0.400 |  |  |  |  |
| R11 | ∞ | d11 = | 0.210 | nd6 | 1.5168 | v6 | 64.17 |
| R12 | ∞ | d12 = | 0.343 |  |  |  |  |

TABLE 6

|  | conic coefficient | aspherical coefficient | | | | | | |
|---|---|---|---|---|---|---|---|---|
|  | k | A4 | A6 | A8 | A10 | A12 | A14 | A16 |
| R1 | 5.0293E−02 | −1.6648E−02 | 2.0914E−02 | −8.3964E−02 | 2.2871E−02 | 3.6796E−02 | 2.4713E−02 | −1.2102E−01 |
| R2 | 0.0000E+00 | −2.3587E−02 | −1.3028E−02 | 8.6541E−02 | −1.3371E−01 | −1.1902E−01 | 7.9135E−03 | 8.3475E−02 |
| R3 | 0.0000E+00 | 6.7753E−02 | 5.6707E−02 | 7.9329E−03 | −4.0681E−02 | −8.4743E−02 | −7.1399E−02 | 1.4226E−01 |
| R4 | −7.4481E+02 | 7.4241E−02 | 2.3237E−02 | −3.4108E−02 | 7.7844E−02 | −8.7183E−02 | −4.8408E−02 | 7.1656E−02 |
| R5 | −1.7288E+02 | −2.4808E−01 | −3.4336E−02 | −1.0681E−01 | 1.8882E−02 | 2.5370E−01 | 2.4159E−01 | −2.6507E−01 |
| R6 | 1.1630E+02 | −1.9963E−01 | −4.9787E−02 | 1.4629E−02 | 4.3659E−02 | 3.9021E−02 | 4.1244E−02 | 3.4483E−02 |
| R7 | 8.3073E+00 | −3.6356E−03 | −1.4810E−02 | −3.1525E−02 | 6.5819E−03 | 4.2367E−03 | 5.9461E−04 | −1.2830E−03 |
| R8 | −3.9564E+00 | −7.6679E−02 | 8.0420E−02 | −3.6601E−02 | 7.4974E−03 | −3.5697E−04 | 3.9863E−04 | −2.3187E−04 |
| R9 | −3.0811E+00 | −4.5194E−02 | 1.2486E−02 | 7.3211E−04 | −2.3459E−04 | −8.4529E−06 | −6.1302E−06 | 1.3923E−06 |
| R10 | −1.8602E+01 | −5.9358E−02 | 1.6922E−02 | −4.2148E−03 | 5.1034E−04 | −3.2042E−05 | −5.0741E−07 | 2.8955E−07 |

Figure 11:
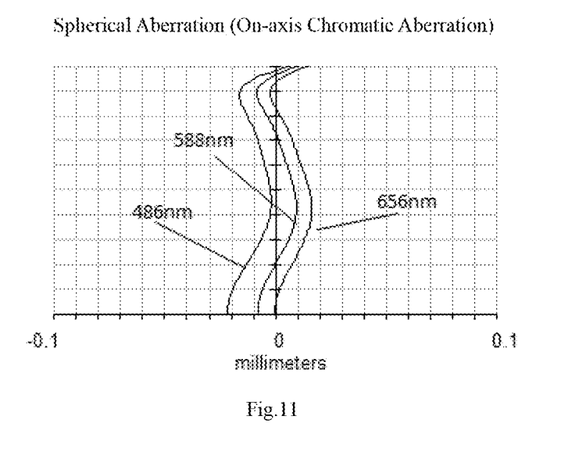
FIG. 11 is an aberration diagram showing spherical aberration (on-axis chromatic aberration) of the imaging lens system of the third embodiment.
Figure 12:
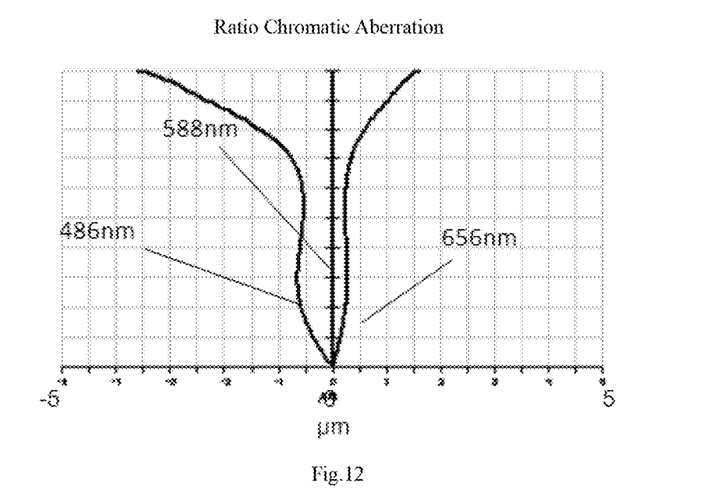
FIG. 12 is a ratio chromatic aberration diagram of the imaging lens system of the third embodiment.
Figure 13:
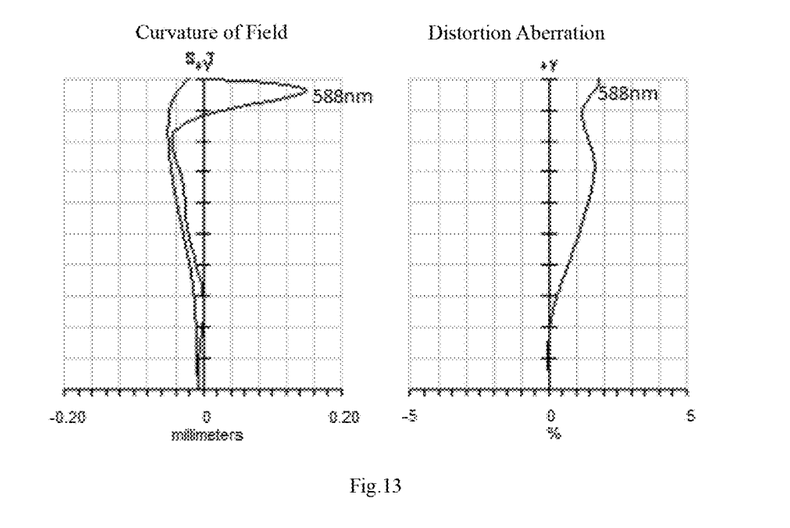
FIG. 13 is an aberration diagram showing the curvature of field and the distortion of the imaging lens system of the third embodiment.

Referring to Tables 5-6, and together with Table 9, the imaging lens system LA of Embodiment 3 satisfies conditions (1)~(8). The spherical aberration (on-axis chromatic aberration) of the imaging lens system LA of embodiment 3 is shown in FIG. 11. The ratio chromatic aberration is shown in FIG. 12. The curvature of field and the distortion aberration are shown in FIG. 13. By virtue of the configuration, the imaging lens system LA of Embodiment 3 has the characteristics of wide-angle, miniaturization, $2\omega=82.1°$, TTL/IH=1.333 mm, and Fno=2.05. According to FIG. 11-FIG. 13, the good optical performance of the imaging lens system LA can be seen.

[Embodiment 4]

Figure 14:
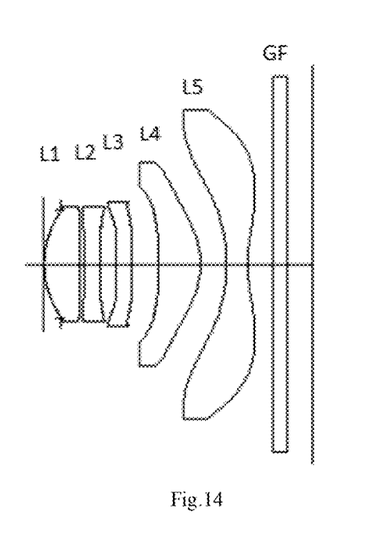
FIG. 14 is an illustrative structure of an imaging lens system related to a fourth embodiment of the present disclosure.

FIG. 14 shows an imaging lens system LA in accordance with Embodiment 4 of the present invention. Table 7 shows the detailed optical data of Embodiment 4. The conic coefficient and aspherical coefficient of the surfaces of the lenses of Embodiment 4 are listed in Table 8.

TABLE 7

| | R | d | | nd | | vd |
|---|---|---|---|---|---|---|
| S1 | ∞ | d0 = | −0.245 | | | |
| R1 | 1.41048 | d1 = | 0.559 | nd1 | 1.5441 | v1 | 56.12 |
| R2 | 95.56154 | d2 = | 0.066 | | | |
| R3 | −6.18289 | d3 = | 0.227 | nd2 | 1.6510 | v2 | 21.51 |
| R4 | 9.67058 | d4 = | 0.259 | | | |
| R5 | 10.81924 | d5 = | 0.237 | nd3 | 1.6510 | v3 | 21.51 |
| R6 | 11.55428 | d6 = | 0.426 | | | |
| R7 | −4.97393 | d7 = | 0.644 | nd4 | 1.5441 | v4 | 56.12 |
| R8 | −1.10822 | d8 = | 0.402 | | | |
| R9 | −2.55084 | d9 = | 0.326 | nd5 | 1.5441 | v5 | 56.12 |
| R10 | 1.93203 | d10 = | 0.400 | | | |
| R11 | ∞ | d11 = | 0.210 | nd6 | 1.5168 | v6 | 64.17 |
| R12 | ∞ | d12 = | 0.394 | | | |

TABLE 8

| | conic coefficient | aspherical coefficient | | | | | | |
|---|---|---|---|---|---|---|---|---|
| | k | A4 | A6 | A8 | A10 | A12 | A14 | A16 |
| R1 | 6.4830E−02 | −1.4573E−02 | 2.2153E−02 | −8.3890E−02 | 2.2183E−02 | 3.5320E−02 | 2.2366E−02 | −1.2384E−01 |
| R2 | 0.0000E+00 | −1.9800E−02 | −1.2894E−02 | 8.5790E−02 | −1.3454E−01 | −1.1985E−01 | 7.3928E−03 | 8.3398E−02 |
| R3 | 0.0000E+00 | 6.4683E−02 | 5.6807E−02 | 8.5774E−03 | −4.0049E−02 | −8.4321E−02 | −7.1204E−02 | 1.4233E−01 |
| R4 | −2.0408E+02 | 7.6417E−02 | 2.3686E−02 | −3.4083E−02 | 7.7329E−02 | −8.7872E−02 | −4.9542E−02 | 6.9981E−02 |
| R5 | −2.9331E+02 | −2.4873E−01 | −3.4570E−02 | −1.0772E−01 | 1.8009E−02 | −2.5322E−01 | 2.4171E−01 | −2.6432E−01 |
| R6 | 1.1450E+02 | −1.9937E−01 | −4.8409E−02 | 1.5979E−02 | 4.4337E−02 | 3.9039E−02 | 4.0430E−02 | 3.2773E−02 |
| R7 | 8.1852E+00 | −5.0026E−03 | −1.4531E−02 | −3.1623E−02 | 6.5349E−03 | 4.3370E−03 | 8.2363E−04 | −1.0064E−03 |
| R8 | −3.8246E+00 | −7.6020E−02 | 8.0534E−02 | −3.6574E−02 | 7.5174E−03 | −3.5074E−04 | 4.0251E−04 | −2.2975E−04 |
| R9 | −3.1029E+00 | −4.5114E−02 | 1.2507E−02 | 7.3216E−04 | −2.3495E−04 | −9.6039E−06 | −6.1690E−06 | 1.3881E−06 |
| R10 | −1.8024E+01 | −5.9790E−02 | 1.6858E−02 | −4.2227E−03 | 5.0959E−04 | −3.2074E−05 | −5.0440E−07 | 2.9074E−07 |

Figure 15:
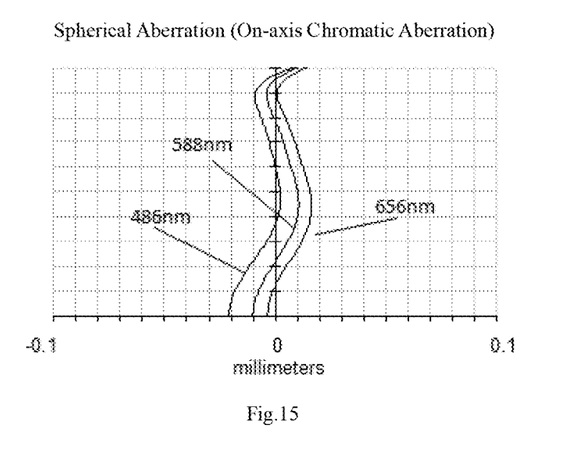
FIG. 15 is an aberration diagram showing spherical aberration (on-axis chromatic aberration) of the imaging lens system of the fourth embodiment.
Figure 16:
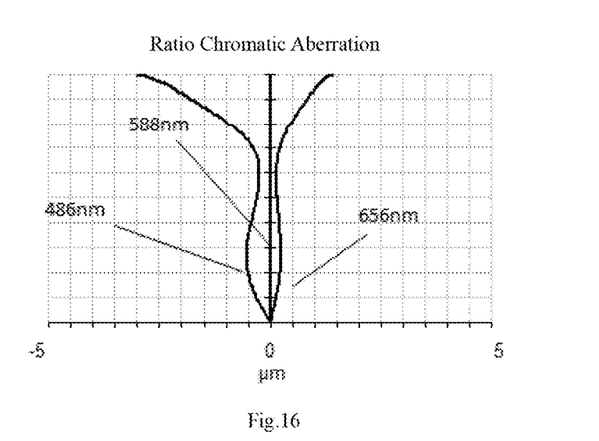
FIG. 16 is a ratio chromatic aberration diagram of the imaging lens system of the fourth embodiment.
Figure 17:
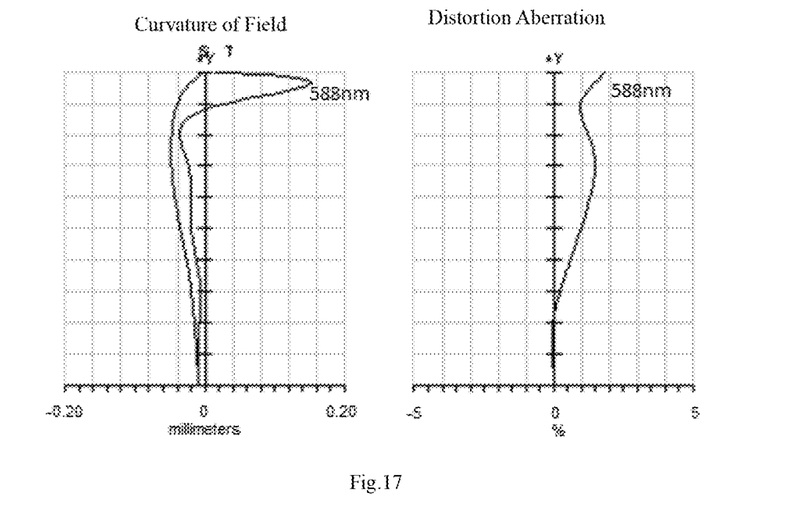
FIG. 17 is an aberration diagram showing the curvature of field and the distortion of the imaging lens system of the fourth embodiment.

Referring to Tables 7-8, and together with Table 9, the imaging lens system LA of Embodiment 4 satisfies conditions (1)~(8). The spherical aberration (on-axis chromatic aberration) of the imaging lens system LA of embodiment 4 is shown in FIG. 15. The ratio chromatic aberration is shown in FIG. 16. The curvature of field and the distortion aberration are shown in FIG. 17. By virtue of the configuration, the imaging lens system LA of Embodiment 4 has the characteristics of wide-angle, miniaturization, $2\omega=81.6°$, TTL/IH=1.344 mm, and Fno=2.10. According to FIG. 15-FIG. 17, the good optical performance of the imaging lens system LA can be seen.

Table 9 shows all the parameters of the imaging lenses of the embodiments corresponding to conditions (1)~(12), and the unit of each of lengths f1-f6, f, TTL, LB and IH is millimeter (mm).

TABLE 9

| | Embodiment 1 | Embodiment 2 | Embodiment 3 | Embodiment 4 | Remarks: |
|---|---|---|---|---|---|
| f1/f | 0.772 | 0.738 | 0.775 | 0.750 | Condition (1) |
| (R1 + R2)/(R1 − R2) | −1.025 | −1.029 | −1.110 | −1.030 | Condition (2) |
| (R3 + R4)/(R3 − R4) | −0.496 | −0.476 | −0.500 | −0.220 | Condition (3) |
| d8/f | 0.136 | 0.112 | 0.126 | 0.115 | Condition (4) |
| d6/f | 0.122 | 0.121 | 0.125 | 0.122 | Condition (5) |
| f2/f | −1.767 | −1.690 | −1.888 | −1.645 | Condition (6) |
| f3/f | 260.825 | 401.609 | 375.503 | 66.175 | Condition (7) |
| (R5 + R6)/R5 − R6) | −171.270 | −456.609 | −371.388 | −30.439 | Condition (8) |
| Fno | 2.05 | 2.05 | 2.05 | 2.10 | |
| 2ω | 83.0 | 80.8 | 82.1 | 81.6 | |
| TTL/IH | 1.327 | 1.350 | 1.333 | 1.344 | |
| f | 3.421 | 3.548 | 3.470 | 3.503 | |
| f1 | 2.640 | 2.619 | 2.690 | 2.626 | |
| f2 | −6.045 | −5.997 | −6.553 | −5.761 | |
| f3 | 892.407 | 1426.152 | 1303.078 | 231.795 | |
| f4 | 2.524 | 2.514 | 2.519 | 2.475 | |
| f5 | −2.005 | −1.955 | −1.946 | −1.970 | |

TABLE 9-continued

|     | Embodiment 1 | Embodiment 2 | Embodiment 3 | Embodiment 4 | Remarks: |
|-----|--------------|--------------|--------------|--------------|----------|
| TTL | 4.097        | 4.170        | 4.115        | 4.150        |          |
| LB  | 0.951        | 1.009        | 0.953        | 1.004        |          |
| IH  | 3.088        | 3.088        | 3.088        | 3.088        |          |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging lens system LA comprising, arranged in succession from an object side to an image side:
a first lens L1 having a positive refractive power,
a second lens L2 having a negative refractive power,
a third lens L3 having a positive refractive power,
a fourth lens L4 having a positive refractive power,
and a fifth lens L5 having a negative refractive power,
wherein the following conditions (1)~(4) are satisfied:

$$0.70 \leq f1/f \leq 0.85 \quad (1)$$

$$-1.15 \leq (R1+R2)/(R1-R2) \leq -1.00 \quad (2)$$

$$-0.55 \leq (R3+R4)/(R3-R4) \leq -0.22 \quad (3)$$

$$0.09 \leq d8/f \leq 0.15 \quad (4)$$

where,
f is a focal length of the imaging lens system LA;
f1 is a focal length of the first lens L1;
R1 is a curvature radius of the object side of the first lens L1;
R2 is a curvature radius of the image side of the first lens L1.
R3 is a curvature radius of the object side of the second lens L2;
R4 is a curvature radius of the image side of the second lens L2;
d8 is an axial distance between the image side of the fourth lens L4 to the object side of fifth lens L5.

2. The imaging lens system LA as claimed in claim 1 further satisfying the following condition (5):

$$0.12 \leq d6/f \leq 0.15 \quad (5)$$

Where:
f is the focal length of the imaging lens system LA;
d6 is an axial distance between the image side surface of the third lens L3 and the object side surface of the fourth lens L4.

3. The imaging lens system LA as claimed in claim 1 further satisfying the following condition (6):

$$-2.50 \leq f2/f \leq -1.00 \quad (6)$$

Where:
f is the focal length of the imaging lens system LA;
f2 is a focal length of the second lens L2.

4. The imaging lens system LA as claimed in claim 1 further satisfying the following conditions (7)-(8):

$$f3/f \geq 50.00 \quad (7)$$

$$(R5+R6)/(R5-R6) \leq -8.00 \quad (8)$$

Where:
f is the focal length of the imaging lens system LA;
f3 is a focal length of the third lens L3;
R5 is a curvature radius of the object side the third lens L3;
R6 is a curvature radius of the image side of the third lens L3.

* * * * *